(12) United States Patent
El-Moussa et al.

(10) Patent No.: US 10,771,483 B2
(45) Date of Patent: Sep. 8, 2020

(54) IDENTIFYING AN ATTACKED COMPUTING DEVICE

(71) Applicant: British Telecommunications Public Limited Company, London (GB)

(72) Inventors: Fadi El-Moussa, London (GB); Theo Dimitrakos, London (GB)

(73) Assignee: British Telecommunications Public Limited Company, London (GB)

( * ) Notice: Subject to any disclaimer, the term of this patent is extended or adjusted under 35 U.S.C. 154(b) by 279 days.

(21) Appl. No.: 15/857,163

(22) Filed: Dec. 28, 2017

(65) Prior Publication Data

US 2018/0191751 A1      Jul. 5, 2018

(30) Foreign Application Priority Data

Dec. 30, 2016  (EP) .................................... 16207655
Dec. 30, 2016  (GB) .................................... 1622449.5

(51) Int. Cl.
*H04L 29/06* (2006.01)
*G06F 16/901* (2019.01)

(52) U.S. Cl.
CPC ...... *H04L 63/1416* (2013.01); *G06F 16/9024* (2019.01); *H04L 63/1425* (2013.01); *H04L 63/1433* (2013.01); *H04L 63/1441* (2013.01)

(58) Field of Classification Search
CPC ............ H04L 63/1416; H04L 63/1425; H04L 63/1433; H04L 63/1441; G06F 16/9024
See application file for complete search history.

(56) References Cited

U.S. PATENT DOCUMENTS 7,716,739 B1      5/2010   McCorkendale et al.
7,779,119 B2 *   8/2010   Ginter .................... G06F 21/55
                                                                 709/219

(Continued)

FOREIGN PATENT DOCUMENTS

EP      2741227 A1      6/2014
EP      2816469 A1      12/2014

(Continued)

OTHER PUBLICATIONS

Application and Filing Receipt for U.S. Appl. No. 16/065,482, filed Jun. 22, 2018, Inventor(s): Kallos et al.

(Continued)

*Primary Examiner* — Ayoub Alata
(74) *Attorney, Agent, or Firm* — Patterson Thuente Pedersen, P.A.

(57) ABSTRACT

A computer implemented method to identify an attacked computing device in a system of network-connected computing devices providing a plurality of computing services, the method including receiving a first data structure including data modeling relationships between vulnerabilities of computing services in a first proper subset of the plurality of computing services and exploitation of such vulnerabilities to identify one or more series of exploits involved in a network attack; receiving a second data structure including data modeling the computing devices in the system including the network connections of each computing device; and comparing the first and second data structures to identify the attacked computing device as an intermediate device in communications between at least two computer services in any of the one or more series of exploits.

10 Claims, 7 Drawing Sheets

(56) References Cited

U.S. PATENT DOCUMENTS

| | | | |
|---|---|---|---|
| 8,042,149 B2* | 10/2011 | Judge | H04L 63/14 726/1 |
| 8,402,540 B2* | 3/2013 | Kapoor | G06F 9/505 726/23 |
| 8,898,788 B1 | 11/2014 | Aziz et al. | |
| 9,009,825 B1 | 4/2015 | Chang et al. | |
| 9,807,106 B2 | 10/2017 | Daniel et al. | |
| 2003/0084349 A1 | 5/2003 | Friedrichs et al. | |
| 2004/0230834 A1 | 11/2004 | McCallam | |
| 2007/0240222 A1 | 10/2007 | Tuvell et al. | |
| 2008/0046393 A1* | 2/2008 | Jajodia | H04L 63/1441 706/50 |
| 2010/0011029 A1 | 1/2010 | Niemelae et al. | |
| 2010/0262873 A1 | 10/2010 | Chang et al. | |
| 2011/0023118 A1 | 1/2011 | Wright | |
| 2011/0167491 A1 | 7/2011 | Ruggerio | |
| 2012/0284794 A1 | 11/2012 | Trent et al. | |
| 2013/0006949 A1 | 1/2013 | Essawi et al. | |
| 2013/0318615 A1* | 11/2013 | Christodorescu | H04L 63/1408 726/25 |
| 2014/0164251 A1 | 6/2014 | Loh et al. | |
| 2015/0120567 A1 | 4/2015 | Van Rooyen et al. | |
| 2015/0304346 A1 | 10/2015 | Kim | |
| 2015/0332283 A1 | 11/2015 | Witchey | |
| 2016/0162690 A1* | 6/2016 | Reith | G06F 21/577 726/25 |
| 2016/0366155 A1 | 12/2016 | El-Moussa et al. | |
| 2017/0013000 A1 | 1/2017 | El-Moussa et al. | |
| 2017/0142133 A1 | 5/2017 | Kallos | |
| 2017/0223032 A1 | 8/2017 | El-Moussa et al. | |
| 2017/0289187 A1* | 10/2017 | Noel | G06F 16/28 |
| 2017/0351860 A1 | 11/2017 | El-Moussa et al. | |
| 2017/0351861 A1 | 12/2017 | El-Moussa et al. | |
| 2018/0025166 A1 | 1/2018 | Daniel et al. | |
| 2018/0115566 A1 | 4/2018 | Azvine et al. | |
| 2018/0115567 A1 | 4/2018 | El-Moussa et al. | |
| 2018/0191751 A1 | 7/2018 | El-Moussa et al. | |
| 2018/0375882 A1 | 12/2018 | Kallos et al. | |

FOREIGN PATENT DOCUMENTS

| | | |
|---|---|---|
| WO | WO-0184285 A2 | 11/2001 |
| WO | WO 2008/091785 A2 | 7/2008 |
| WO | WO-2009097610 A1 | 8/2009 |
| WO | WO-2012087685 A1 | 6/2012 |
| WO | WO-2013172750 A1 | 11/2013 |
| WO | WO 2015/128613 A1 | 9/2015 |
| WO | WO-2015179020 A2 | 11/2015 |
| WO | WO-2016034496 A1 | 3/2016 |
| WO | WO-2017021153 A1 | 2/2017 |
| WO | WO-2017021154 A1 | 2/2017 |
| WO | WO-2017021155 A1 | 2/2017 |
| WO | WO 2017/108576 A1 | 6/2017 |
| WO | WO 2017/109135 A1 | 6/2017 |
| WO | WO-2017/167544 A1 | 10/2017 |
| WO | WO-2017/167545 A1 | 10/2017 |
| WO | WO-2017167547 A1 | 10/2017 |

OTHER PUBLICATIONS

Application and Filing Receipt for U.S. Appl. No. 16/065,554, filed Jun. 22, 2018, Inventor(s): El-Moussa et al.
Application as filed for U.S. Appl. No. 16/065,603, filed Jun. 22, 2018, Inventor(s): El-Moussa et al.
International Search Report and Written Opinion for PCT Application No. PCT/EP2016/081187 dated Feb. 21, 2017; 8 pages.
"Fast Feature Selection Using Fractal Dimension" (Traina et al, 2000).
Guiling Li—et al Fractal-based Algorithm for Anomaly Pattern Discovery on Time Series Stream Journal of Convergence Information Technology. vol. 6. No. 3. Mar. 31, 2011 (Mar. 31, 2011). pp. 181-187. XP055254814. KP ISSN: 1975-9320. DOI: 10.4156jcit.vol6.issue3.20.
Zhang et al, "Detecting Encrypted Botnet Traffic"; Computer Communications Workshops; Computer Science Department, Colorado State University Fort Collins, United States; (INFOCOM WKSHPS), 2013); 6 pages.
"Entropy", R.L. Dobrushin V.V. Prelov, Encyclopedia of Mathematics, URL: http://www.encyclopediaofmath.org/index.php?title=Entropy&oldid=15099; Springer, 2002, ISBN 1402006098; 2 pages (retrieved on Feb. 15, 2018).
Shannon "A Mathematical Theory of Communication" (C.E. Shannon, The Bell System Technical Journal, vol. 27, pp. 379-423, 623-656, Jul., Oct. 1948; 55 pages.
Jean Goubault-Larrecq and Julien Olivain: "Detecting Subverted Cryptographic Protocols by Entropy Checking", Research Report LSV-06-13, Laboratoire Specification et Verification, Jun. 2006 (Jun. 2006), XP055216893, FR Retrieved from the Internet: URL: http://www.lsv.fr/Publis/RAPPORTS_LSV/PDF/rr-lsv-2006-13.pdf 21 pages (retrieved on Feb. 15, 2018).
Braden, R.; Internet Protocol Suite RFC1122; Internet Engineering Task Force, Oct. 1989; "Requirements for Internet Hosts—Communication Layers", https://tools.ietf.org/html/rfc1122; 116 pages (retrieved on Feb. 15, 2018).
H.323 protocol (Packet-Based Multimedia Communications System, the International Telecommunications Union (ITU), 2009 and Amendment 1 dated Mar. 2013, available from www.itu.int/rec/T-REC-H.323); 6 pages.
H.225 "Call signaling protocols and media stream packetization for packet- based multimedia communication systems" International Telecommunication Union, Dec. 2009 and Amendment 1 dated Mar. 2013, 6 pages.
International Telecommunication Union H.245 Series H: Audiovisual and Multimedia Systems Infrastructure of audiovisual services—Communication procedures "Control protocol for multimedia communication", May 2011, 348 pages; www.itu.int/rec/T-REC-H.245).
ITU-T Telecommunication Standardization Sector of ITU; Series H.235.0 to H.235.7, International Telecommunication Union, Sep. 2005 and Jan. 2014, 296 pages; www.itu.int.
"Service Name and Transport Protocol Port No. Registry" (Feb. 15, 2018, available from www.iana.org/assignments/service-names-port-numbers/service-names-port-numbers.txt); 411 pages (retrieved on Mar. 6, 2018).
Chen et al., "Spatial-Temporal Modeling of Malware Propagation in Networks", IEEE Transactions on Neural Networks, vol. 16, No. 5 Sep. 2005, 13 pages.
Bestuzhev, Dmitry, "Steganography or Encryption in Bankers?" Nov. 10, 2011; 3 pages (retrieved on Feb. 15, 2018). https://securelist.com/steganography-or-encryption-in-bankers-11/31650/.
"A Next-Generation Smart Contract and Decentralized Application Platform" Ethereum White Paper, 2016, retrieved from https://github.com/ethereum/wiki/wiki/White-Paper.
Ahmad S., et al., "How Do Neurons Operate on Sparse Distributed Representations? A Mathematical Theory of Sparsity, Neurons and Active Dendrites," available from Cornell University Library (citation arXiv: 1601.00720) and https://arxiv.org/ftp/arxiv/papers/1601/1601.00720.pdf, retrieved on Mar. 28, 2018, 23 pages.
Ahmad S., et al., "Properties of Sparse Distributed Representations and their Application to Hierarchical Temporal Memory," available from Cornell University Library (citation arXiv: 1503.07469) and https://arxiv.org/ftp/arxiv/papers/1503/1503.07469.pdf, retrieved on Mar. 28, 2018, Numenta, Redwood City, CA, USA, Mar. 24, 2015, 18 pages.
Ahmad S., et al., "Real-Time Anomaly Detection for Streaming Analytics," available from Cornell University Library (citation arXiv: 1607.02480) and https://arxiv.org/pdf/1607.02480.pdf, retrieved on Mar. 28, 2018, Numenta, Inc., Redwood City, CA, USA, Jul. 8, 2016, 10 pages.
Anonymous: "Who will protect users from ethereum based malware?" Mar. 28, 2016 XP055306678, Retrieved from the Internet: URL: https://www.reddit.com/r/ethereum/comments/4ccfaa/who_will_protect_users_from_ethereum_based_malware/?st=itbp2q49&sh=d8cc4355 on Sep. 29, 2016.

(56) References Cited

OTHER PUBLICATIONS

Anonymous, "Can BitCoin be a better DRM? BitcoinBeginners," retrieved from https://www.reddit.com/r/BitcoinBeginners/commentsll y5yh8/can bitcoin be_a_better_drm, Feb. 17, 2014, 3 pages.
Anonymous, "Colored Coins—Bitcoin Wiki," Retrieved from https://en.bitcoin.it/w/index.php?title=ColoredCoins&oldid=57259, Jul. 7, 2015, 6 pages.
Antonopoulos A M., "Mastering Bitcoin-Unlocking Digital Crypto-Currencies," Early Release Raw & Unedited, ISBN: 978-1-449-37404-4; retrieved from: https://unglueitfiles.s3.amazonaws.com/ebf/05db7df4f31840f0a873d6ea14dcc28d.pdf, Dec. 2014, 282 pages.
Asmi E.A.K., et al., "Bitcoin-Based Decentralized Carbon Emissions Trading Infrastructure Model," Systems Engineering, Mar. 2015, vol. 18 (2), Retrieved from the Internet: URL: https://www.researchgate.net/publication/268686553, 15 pages.
Sood A.K., et al., "An Empirical Study of HTTP-based Financial Botnets," IEEE Transactions on Dependable and Secure Computing, IEEE Service Center, New York, NY, US, vol. 13 (2), Mar. 2016, pp. 236-251.
Tschorsch F., et al., "Bitcoin and Beyond: A Technical Survey on Decentralized Digital Currencies," International Association for Cryptologic Research, May 15, 2015, pp. 1-37.
Wang Z., "The Applications of Deep Learning on Traffic Identification," 2015.
Wikipedia, "Block chain (database)—Wikipedia, the free encyclopedia", Nov. 29, 2015, retrieved from the Internet: URL: https://en.wikipedia.org/w/index.php?title=Block_chain_(database)&oldid=692921608.
Application and Filing Receipt for U.S. Appl. No. 15/541,089, filed Jun. 30, 2017, Inventor(s): El-Moussa et al.
Application and Filing Receipt for U.S. Appl. No. 15/541,128, filed Jun. 30, 2016, Inventor(s): El-Moussa et al.
Application as filed for U.S. Appl. No. 16/086,142, filed Sep. 18, 2018, Inventor(s): El-Moussa et al.
Rosenfeld M., "Overview of Colored Coins," https:1/bravenewcoin.com/assets/Whitepapers/Overview-of-Colored-Coins.pdf, Dec. 4, 2012, 13 pages.
Application as filed for U.S. Appl. No. 16/086,230, filed Sep. 18, 2018, Inventor(s): El-Moussa et al.
Assia Y., et al., "Colored Coins Whitepaper," 2015, available at docs.google.com/document/d/1AnkPcVZTCMLizw4DvsW6M8Q2JCOllzrTLuoWu2z1BE, 23 pages.
Benders J.F., "Partitioning Procedures for Solving Mixed Variables Programming Problems," 1962, vol. 4, pp. 238-252.
Billaudelle S., et al., "Porting HTM Models to the Heidelberg Neuromorphic Computing Platform," available from Cornell University Library (citation arXiv: 1505. 02142), retrieved on Mar. 28, 2018, from https://arxiv.org/pdf/1505.02142.pdf, Kirchhoff—Institute for Physics, May 2015, 9 pages.
Biryukov A., et al., "University of Luxembourg" Jan. 19, 2016, XP055306767, Luxemburg, retrieved from URL:http://wwwfr.uni.lu/snt/news_events/speaker_s_presentations on Sep. 29, 2016, pp. 5 and 29.
Bonneau J., et al., "Research Perspectives and Challenges for Bitcoin and Cryptocurrencies," International Association for Cryptologic Research, Mar. 19, 2015, 18 pages.
Chaisiri, "Optimization of Resource Provisioning Cost in Cloud Computing," IEEE Transactions on Services Computing, Apr.-Jun. 2012, vol. 5 (2), 14 pages.
Cruz J.P., et al., "The Bitcoin Network as Platform for TransOrganizational Attribute Authentication," WEB 2015, The Third International Conference on Building and Exploring Web Based Environments, XP055239598, Rome, Italy, 2015, 7 pages.
Cui, et al., "Continuous Online Sequence Learning with an Unsupervised Neural Network Model," Published in Neural Computation and available from https://www.mitpressjournals.org/doi/pdf/10.1162/NECOa_00893, retrieved on Mar. 28, 2018, Numenta Inc., Redwood City, CA, USA, Nov. 2016, vol. 28 (11), 31 pages.

Cui, et al., "The HTM Spatial Pooler: A Neocortical Algorithm for Online Sparse Distributed Coding," available from Cold Spring Harbor Laboratory bioRxiv (citation doi.org/10.1101/085035) and https://www.biorxiv.org/content/biorxiv/early/2017/02/16/085035.full.pdf, retrieved on Mar. 28, 2018, Numenta Inc., Redwood City, CA, USA, Feb. 3, 2017, 16 pages.
Czepluch J.S., et al., "The Use of Block Chain Technology in Different Application Domains," XP055242451, retrieved from http://http://www.lollike.org/bachelor.pdf, May 20, 2015, 109 pages.
Dr Gavin Wood, "Ethereum: A Secure Decentralize Generalized Transaction Ledger," EIP-150 Revision, Retrieved from http://gavwood.com//paper.pdf, Jun. 4, 2014, 32 pages.
Fischer A., et al., "An Introduction to Restricted Boltzmann Machines," in: Progress in Pattern Recognition, Image Analysis, Computer Vision and Applications, vol. 7441 of the series Lecture Notes in Computer Science, 2012, pp. 14-36.
Grushack J., et al., "Currency 3.0, Examining Digital Crypto Currency Markets," Union College, XP055242356, Retrieved from http://antipasto.union.edu/engineering/Archives/SeniorProjects/2014/CS.2014/files/grushacj/grushacj_paper.pdf, Jun. 2014, 44 pages.
Hawkins, et al., in "On Intelligence, How a New Understanding of the Brain Will Lead to the Creation of Truly Intelligent Machines," Times Books, ISBN 0-8050-7 456-2, 2004, Jul. 14, 2005; 174 pages.
Hawkins, et al., "Why Neurons Have Thousands of Synapses, a Theory of Sequence Memory in Neocortex," Published in Frontiers in Neural Circuits (10 (2016) 1-13, doi:10.3389/fncir.2016.00023) and available from https://www.frontiersin.org/articlesll0.3389/fncir.2016.00023/full, retrieved on Mar. 28, 2018, Numenta Inc., Redwood City, CA, USA, Mar. 30, 2016, 13 pages.
International Preliminary Report on Patentability for Application No. PCT/EP2017/055081, dated Oct. 11, 2018, 9 pages.
International Preliminary Report on Patentability for Application No. PCT/EP2017/055082, dated Oct. 11, 2018, 8 pages.
International Search Report and Written Opinion for Application No. PCT/EP2017/055081, dated Apr. 7, 2017, 11 pages.
International Search Report and Written Opinion for Application No. PCT/EP2017/055082, dated Apr. 26, 2017, 9 pages.
Lavin, et al., "Evaluating Real-time Anomaly Detection Algorithms, the Numenta Anomaly Benchmark," available from Cornell University Library (citation archive:1510.03336) https://arxiv.org/ftp/arxiv/papers/1510/1510.03336.pdf, retrieved on Mar. 28, 2018, Numenta, Inc., Redwood City, CA, USA, Oct. 9, 2015, 8 pages.
Adler M., "Threat Intelligence Visibility—the way forward," BT, 2015, available from www.globalservices.bt.com/uk/en/products/assure threat_ monitoring.
Miller a., "The State-of-the-Art of Smart Contracts" Jan. 19, 2016, XP055306766, Luxemburg retrieved from the Internet: URL: http://wwwfr.uni.lu/snt/news_events/speaker_s_presentations on Sep. 29, 2016, pp. 7-8, 16 and 18.
Numenta, "Biological and Machine Intelligence (BAMI), a living book that documents Hierarchical Temporal Memory (HTM)," Numenta, Inc., Mar. 8, 2017, retrieved on Mar. 28, 2018 from https://numenta.com/assets/pdf/biological-and-machine-intelligence/BAMIComplete.pdf, 69 pages.
Numenta, "Hierarchical Temporal Memory including HTM Cortical Learning Algorithms," Version 0.2.1, Numenta, Sep. 12, 2011, 68 pages.
Numenta, "Sparse Distributed Representations," Numenta, available from https://numenta.com/assets/pdf/biological-and-machine-intelligence/BaMISDR.pdf and accessed on Mar. 29, 2017, retrieved on Mar. 28, 2018, 15 pages.
Olshausen, et al., "Sparse Coding with an Overcomplete Basis Set, a Strategy Employed by VI?" Olshausen, B.A., Field, D.J., 1997, Vision Research, 37:3311-3325) retrieved on Mar. 28, 2018 from http://www.chaos.gwdg.de/michael/Cns course_2004/papersmax/OlshausenFieldl997.pdf, Dec. 24, 1996, 15 pages.
Plohmann D., et al., "Case study of the Miner Botnet", Cyber Conflict (CYCON), 2012 4th International Conference on Jun. 5, 2012, pp. 1-16.
Shah S.Y., et al., "Price Based Routing for Event Driven Prioritized Traffic in Wireless Sensor Networks," Apr. 29-May 1, 2013, IEEE 2nd Network Science Workshop, XP032487185, 8 pages.

(56) References Cited

OTHER PUBLICATIONS

Purdy S., "Encoding Data for HTM Systems," Available from Cornell University Library (citation arXiv: 1602.05925), retrieved on Mar. 28, 2018 from https://arxiv.org/ftp/arxiv/papers/1602/1602.05925.pdf, Numenta, Inc., Redwood City, California, USA, Feb. 2016, 11 pages.

Application and Filing Receipt for U.S. Appl. No. 15/120,996, filed Aug. 23, 2016, Inventor(s): El-Moussa et al.

Application and Filing Receipt for U.S. Appl. No. 15/121,008, filed Aug. 23, 2016, Inventor(s): El-Moussa et al.

Application and Filing Receipt for U.S. Appl. No. 15/121,015, filed Aug. 23, 2016, Inventor(s): El-Moussa et al.

Application and Filing Receipt for U.S. Appl. No. 15/559,328, filed Sep. 18, 2016, Inventor(s): Azvine et al.

Application and Filing Receipt for U.S. Appl. No. 15/559,346, filed Sep. 18, 2016, Inventor(s): El-Moussa et al.

Application and Filing Receipt for U.S. Appl. No. 15/319,970, filed Dec. 19, 2016, Inventor(s): Kallos.

Frigault, Marcel; "Measuring Network Security Using Bayesian Network-Based Attack" A Thesis in the Concordia Institute for Information Systems Engineering; Mar. 2010; Concordia University, Montreal; 88 pages.

CVE Details the Ultimate Security Vulnerability Datasouce; "Current CVSS Score Distribution for All Vulnerabilities"; (retrieved Jun. 28, 2018); https://www.cvedetails.com/; 1 page.

CVSS Common Vulnerability Scoring System v3.0: User Guide v1.5; 15 pages.

Opnet Technologies Network Simulator | Riverbed; (retrieved Jun. 28, 2018); https://www.riverbed.com/products/steelcentral/opnet.html?redirect=opnet; 5 pages.

Skybox Security; Cybersecurity Management & Analytics; https://www.skyboxsecurity.com/; (retrieved Jul. 12, 2018); 7 pages.

Munoz-Gonzalez "Exact Inference Techniques for the Dynamic Analysis of Bayesian Attack Graphs" (Luis Munoz-Gonzalez, Daniel Sgandurra, Martin Barrere, and Emil Lupu, Oct. 2015); 14 pages.

* cited by examiner

IDENTIFYING AN ATTACKED COMPUTING DEVICE

CROSS-REFERENCE TO RELATED APPLICATIONS

The present application claims priority to EP Application No. 16207655.8 filed Dec. 30, 2016, and GB Application No.: 1622449.5 filed Dec. 30, 2016, each of which is hereby incorporated by reference in its entirety.

TECHNICAL FIELD

The present disclosure relates to the detection of network attacks for a computer system.

BACKGROUND

Network-connected computer systems can include network-connected computing devices providing computing services. A computer network used for communication with the devices and services can be used by malicious entities to mount attacks on a computer system and the devices and/or services therein. Such attacks can include unauthorized access, use and/or modification of computing resources.

SUMMARY

Thus there is a need to protect network-connected computer systems from such attacks.

The present disclosure accordingly provides, in a first aspect, a computer implemented method to identify an attacked computing device in a system of network-connected computing devices providing a plurality of computing services, the method comprising: receiving a first data structure including data modeling relationships between vulnerabilities of computing services in a first proper subset of the plurality of computing services and exploitation of such vulnerabilities to identify one or more series of exploits involved in a network attack; receiving a second data structure including data modeling the computing devices in the system including the network connections of each computing device; and comparing the first and second data structures to identify the attacked computing device as an intermediate device in communications between at least two computer services in any of the one or more series of exploits.

In some embodiments the method further comprises, in response to the identification of the attacked computing device, implementing protective measures to protect the attacked computing device from the attack.

In some embodiments the first data structure is an attack graph.

In some embodiments the attack graph is a directed acyclic graph data structure.

In some embodiments the second data structure is a network map.

In some embodiments the second data structure is automatically generated by software adapted to map a networked computer system.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION

Figure 1:
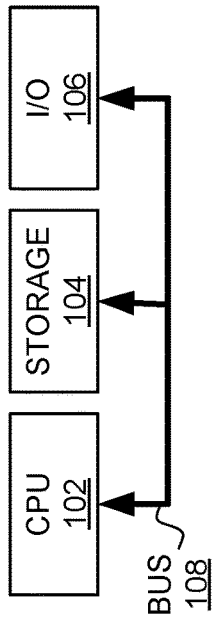
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
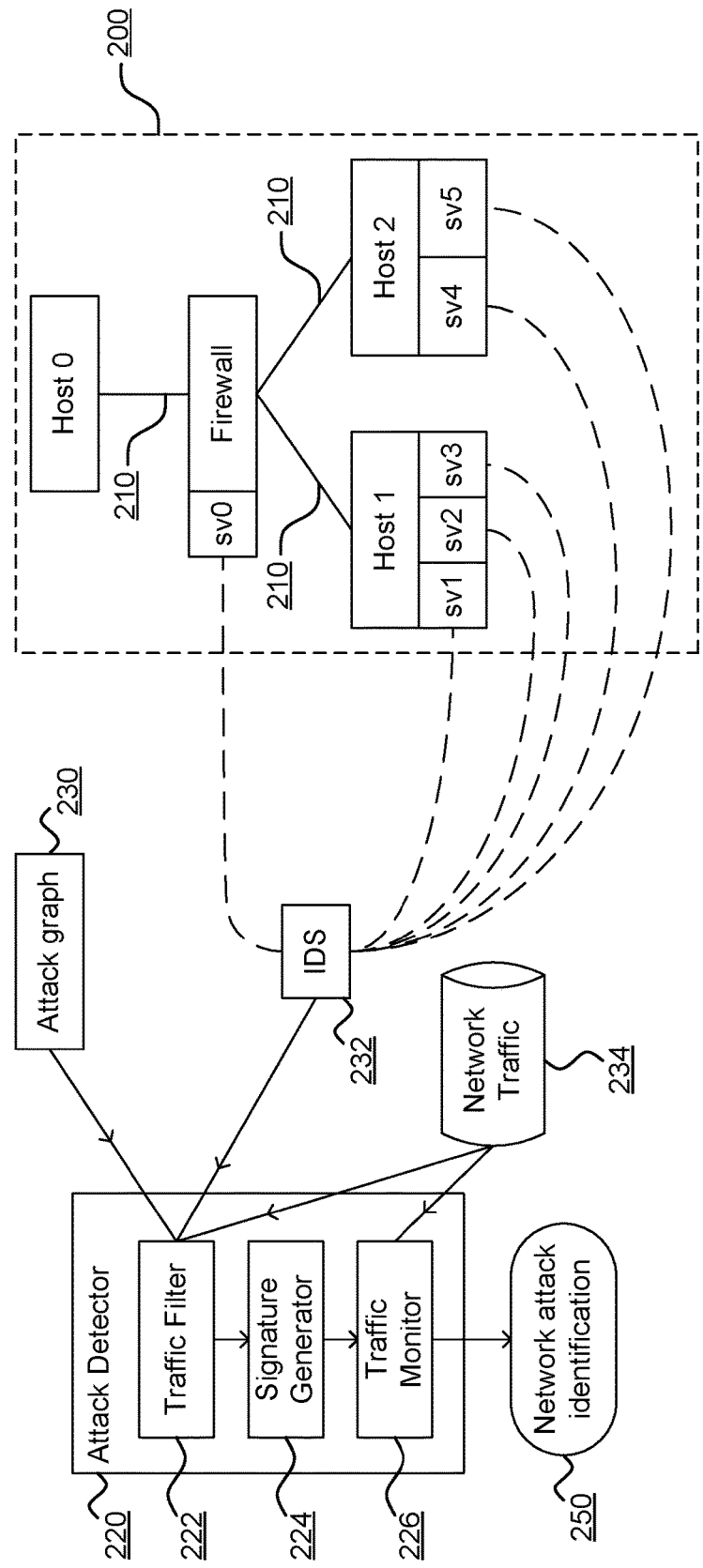
FIG. 2 is a component diagram of an attack detector for identifying a network attack in a network-connected computer system in accordance with embodiments of the present disclosure.

FIG. 2 is a component diagram of an attack detector 220 for identifying a network attack in a network-connected computer system 200 in accordance with embodiments of the present disclosure. The computer system 200 is a purely exemplary configuration of network-connected computing devices "Host 0", "Host 1", "Host 2" and a "Firewall" such that the Firewall is intermediate to Host 0, on one side of the Firewall, and Hosts 1 and 2 on another side of the Firewall. Each of the computing devices can be hardware, software, firmware or combination components that are adapted to communicate via a communications network 210. In some embodiments one or more of the computing devices can be virtualized devices. The network 210 can be a wired, wireless, local or wide area network or a combination of any or all of these types of network. In some embodiments, at least part of the network 210 is a public network such as the internet. For example, in one arrangement Host 0 and the Firewall are connected to the internet and each of Host 1 and Host 2 are connected to a private or intranet network separated from the internet by the Firewall.

At least some of the computing devices provide computing services in the system 200. In the exemplary arrangement of FIG. 2: Firewall provides service "sv0"; Host 1 provides services "sv1", "sv2" and "sv3"; and Host 2 provides services "sv4" and "sv5". Computing services can be hardware, software, firmware or combination services such as functions, facilities, routines, procedures, applications or the like. Such services typically involve a network communication component. For example, computing services can include: file transfer services such as software using a file transfer protocol (FTP); shell or remote desktop services such as remote shell (rsh), secure shell (ssh), telnet, remote desktop protocol (RDP), TeamViewer, Remote Utilities, Ammyy Admin, Virtual Network Computing (VNC), AeroAdmin, Windows Remote Desktop, Remote PC, Firnass, Chrome Remote Desktop, AnyDesk, Lync, Skype for Business or the like; mail, messaging, collaboration or communication software such as electronic mail software using a mail transport protocol such as the simple mail transfer protocol (SMTP), instant messaging applications such as Lync, Skype, Sametime, Facebook Messenger, WhatsApp, WeChat, Snapchat, Telegram, Line, Viber, Facetime and the like, and peer-to-peer communications services such as torrent software; name resolution and/or domain name services (DNS); host initialization services such as bootstrap protocols; network host management services such as services employing the simple network management protocol (SNMP); applications such as a server using hypertext transfer protocol (HTTP), network news transfer protocol (NNTP), application server, media server including, inter alia, video, audio, image and/or document servers such as multimedia communications services using a H.323 protocol, network server, entertainment server such as a game server or the like; security or protective services such as a network proxy, firewall, intrusion detection, virus detection, malware detection and the like; services for peripheral devices such as network printer services, network scanner services, network attached storage, network file system (NFS), network attached manufacturing, machining, tooling or engineering devices or apparatus such as robots, additive manufacturing devices (such as 3D printers), formative manufacturing devices, physical transport devices, machine forming apparatus and the like; blockchain services; services providing remote procedure call or remote method invocation facilities over a network; anonymity services such as Tor; telephony such as voice over internet protocol, video conferencing protocols, audio and or video communication and the like; and other computing services as will be apparent to those skilled in the art.

Notably, any particular computer service can include an identification of a network configuration such as one or more particular network ports and/or protocols such that a single software component (e.g. server, web server or the like) can provide potentially multiple computing services such as via different ports and/or protocols.

The computer system 200 is arranged with one or more network security components such as an intrusion detection system (IDS) 232. The IDS 232 is a software, hardware, firmware or combination component adapted to monitor one or more aspects of the computer system 200 to identify one or more of: actual or potential malicious activity occurring in, by, to or in relation to computing devices in the system 200; and violations or deviations from a policy, acceptable or determined normal or typical behavior or activity of computing devices in the system 200. For example, the IDS 232 can be a network intrusion detection system (NIDS) configured to monitor traffic to and from computing devices and/or services at one or more points in the network of the system 200. Additionally or alternatively, the IDS 232 can be a host intrusion detection system (HIDS) run on or in association with one or more computing devices of the system 200 to, for example, monitor inbound and outbound network communication such as network packets at those computing devices. Other such suitable IDS components may be apparent to those skilled in the art. Whichever type or types of IDS 232 are deployed, the IDS 232 detects attacks or potential attacks of computing services in the system 200. For example, the IDS 232 can employ a signature-based attack detection mechanism in which one or more rules and/or patterns indicating an attack are used, such as byte sequences in network traffic or known malicious instruction sequences used by malicious software. Additionally or alternatively, the IDS 232 can employ an anomaly-based attack detection mechanism where a model of trustworthy activity is used to identify a deviation from such activity as a potential attack. Thus, in use, the IDS 232 is operable to identify computer services in the system 200 for which attacks or potential attacks are detected. While a single IDS 232 is illustrated in FIG. 2 it will be appreciated by those skilled in the art that any number of such facilities may be provided. Further, while the IDS 232 of FIG. 2 is illustrated external to the system 200 it will be appreciated by those skilled in the art that such facilities may be provided internal to, in communication with, integral to or remote from devices and/or services of the system 200.

The arrangement of FIG. 2 further includes an attack graph 230. The attack graph 230 is organized as a data structure including data modeling relationships between known vulnerabilities of one or more computing services in the system 200 and potential exploits of those vulnerabilities employed to achieve a particular network attack of the system 200. Thus the attack graph 230 identifies one or more series of exploits and/or steps involved in a network attack. The attack graph 230 is thus generated based on knowledge of vulnerabilities of computing services and how those vulnerabilities can be exploited. Extensive databases of vulnerability and exploit information can be used to inform the generation of such graphs such as the definition of Common Vulnerabilities and Exposures (CVE) maintained by MITRE Corporation as the National Cybersecurity Federally Funded Research and Development Center (FFRDC) in the USA. For example, MITRE Corporation provide CVE details at www.cvedetails.com including vulnerabilities categorized by type and providing information for each vulnerability including: a vulnerability score using the Common Vulnerability Scoring System (CVSS) indicating a severity of the vulnerability ("Common Vulnerability Scoring System, V3 Development Update," First.org, Inc., available at www.first.org/cvss); a potential impact of the vulnerability in a number of respects including an indication of impact on confidential information, integrity and availability of a computing service; an indication of a level of complexity involved to exploit the vulnerability; whether unauthorized or malicious access to computing services, resources, devices or systems can be gained by exploiting the vulnerability; and computing services such as products affected by the vulnerability. In CVE vulnerabilities are generally categorized into the following types: denial of service (DoS); code execution; overflow; memory corruption; structured query language (SQL) injection; cross-site scripting (XSS); directory traversal; HTTP response splitting; bypassing;

gaining information; gaining privileges; cross-site request forgery (CSRF); and file inclusion.

Attack graphs can be structured as directed acyclic graphs indicating paths that an attacker can take to reach a given goal (the attack objective). Thus attack graphs indicate sequences of exploits of vulnerabilities, for example each successive exploit can result in an attacker obtaining additional security privileges towards the attack objective. Attack graphs are described in detail in "Measuring Network Security Using Bayesian Network-Based Attack Graphs" (Marcel Frigault and Lingyu Wang, January 2008, DOI: 10.1109/COMPSAC.2008.88•Source: IEEE Xplore); "Measuring Network Security Using Bayesian Network-Based Attack Graphs—A Thesis in the Concordia Institute for Information Systems Engineering" (Marcel Frigault, March 2010, Concordia University, Montreal, available at spectrum.library.concordia.ca/979259); and "Exact Inference Techniques for the Dynamic Analysis of Bayesian Attack Graphs" (Luis Munoz-Gonzalez, Daniel Sgandurra, Martin Barrere, and Emil Lupu, October 2015).

Figure 3:
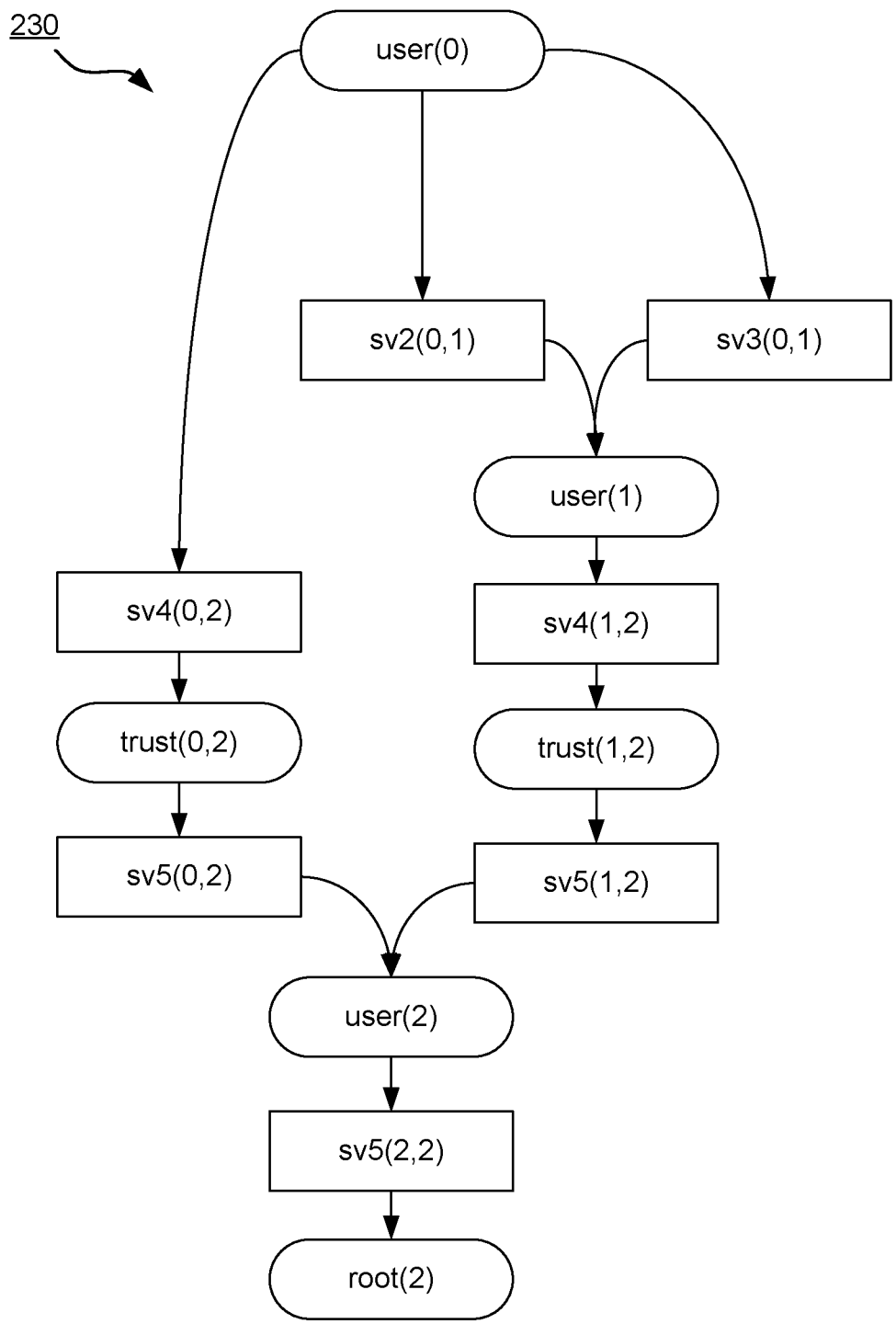
FIG. 3 depicts an exemplary attack graph for an attack in the computer system of FIG. 2 in accordance with embodiments of the present disclosure.

FIG. 3 depicts an exemplary attack graph 230 for an attack in the computer system 200 of FIG. 2 in accordance with embodiments of the present disclosure. The illustrative exemplary attack graph 230 of FIG. 3 relates to an attack in which the attack objective for an attacker with user access to Host 0 of FIG. 2 to gain privileged root access on Host 2 through which the attacker may make malicious use of, or have malicious effect on, Host 2. In the attack graph 230 conditions or states are represented in boxes with rounded corners where a device involved is indicated inside parentheses (i.e. "(0)" indicates Host 0; "(1,2)" indicates some relationship between Host 1 and Host 2, etc.). Vulnerabilities are depicted in boxes with squared corners, indicating a source and destination device inside parentheses (i.e. "source, destination"). Thus according to the attack graph 230 an attacker can follow three paths starting from the topmost state "user(0)" to achieve the attack objective. Each path will be outlined briefly in turn.

According to a first attack path through the graph 230, at the initial state "user(0)" the attacker can exploit a vulnerability in computing service sv4 of Host 2 to achieve a state of trust between Host 0 and Host 2. Subsequently, in this state of trust the attacker can exploit a vulnerability in sv5 of Host 2 to achieve a state of user level access to Host 2. Finally the attacker can exploit a further vulnerability in sv5 of Host 2 to achieve a state of root level access to Host 2.

According to a second attack path through the graph 230, at the initial state "user(0)" the attacker can exploit a vulnerability in computing service sv2 of Host 1 to achieve a state of user level access to Host 1. The attacker can then exploit a vulnerability in service sv4 of Host 2 to achieve a state of trust between Host 1 and Host 2. Subsequently, in this state of trust the attacker can exploit a vulnerability in sv5 of Host 2 to achieve a state of user level access to Host 2. Finally the attacker can exploit a further vulnerability in sv5 of Host 2 to achieve a state of root level access to Host 2.

According to a third attack path through the graph 230, at the initial state "user(0)" the attacker can exploit a vulnerability in computing service sv3 of Host 1 to achieve a state of user level access to Host 1. The attacker can then exploit a vulnerability in service sv4 of Host 2 to achieve a state of trust between Host 1 and Host 2. Subsequently, in this state of trust the attacker can exploit a vulnerability in sv5 of Host 2 to achieve a state of user level access to Host 2. Finally the attacker can exploit a further vulnerability in sv5 of Host 2 to achieve a state of root level access to Host 2.

Notably, in addition to identifying the attack paths to achieve the attack objective in the system 200, the attack graph 230 identifies all computing services potentially exploited in an attack to achieve the attack objective. Thus, according to the exemplary attack graph 230, services sv2, sv3, sv4 and sv5 are potentially exploited though services sv0 and sv1 are not so indicated. Furthermore, the identification of exploited computing services in the attack graph 230 permits an identification of computing devices having the computing services exploited to achieve the attack objective. Thus compromised computing devices can also be identified from the attack graph 230.

Returning to FIG. 2, an attack detector 220 is provided as a hardware, software, firmware or combination component for identify a network attack based on a signature of malicious network traffic identifying the attack. As previously described with respect to IDS 232, a signature includes a definition of one or more rules and/or patterns which, when applied to and/or compared with network traffic, can be used to identify a network attack. In some embodiments signatures can include, inter alia, byte sequences in network traffic or known malicious instruction sequences used by malicious software. Additionally or alternatively signatures can include metrics or measures evaluated for network traffic such as a measure of entropy (such as Shannon Entropy) for at least some portion of network traffic as described in detail in international patent publication WO 2015/128609 (British Telecommunications public limited company). Other patterns and/or rules indicated in a signature for attack detection include: the identification of particular network response data; network traffic having a particular size, length, volume, structure and/or constitution; a series of network communications occurring between two or more computing services of devices conforming to a particular rule or arrangement; a frequency or duration of network traffic or communications; an identification of one or more particular byte sequences, types of byte sequence, packet sequences, types of packet sequence, messages or the like including such as might be identified in no particular order to detect network traffic arising from a polymorphic attack; and other such signature features as will be known to those in the art or as may be conceived in future for detecting malicious network traffic.

The attack detector 220 according to embodiments of the present disclosure generates the attack signature using the signature generator 224 based on network traffic. Accordingly, in use the signature generator 224 operates on network traffic 234 that is known to include malicious network traffic for the network attack. In this way a generated signature can be known to be derived from known malicious network traffic for subsequent use in production computer systems on which basis potential attacks may be identified.

In contrast to the generation of attack signatures in the art, the signature generator 224 according to embodiments of the present disclosure operates on the basis of only a subset of network traffic obtained from the computing system 200. The subset of network traffic is obtained by filtering network traffic 234 obtained from the computing system by a traffic filter 222 as will be described below.

The traffic filter 222 is a software, hardware, firmware or combination component for filtering network traffic 234 obtained from the computing system 200. The network traffic 234 can be obtained and processed in real-time over a period of time or can be stored and accessed in batch. The traffic filter 222 identifies a proper subset of the network traffic 234 by filtering the network traffic 234 such that the subset includes only network traffic that is both associated with computing services being identified by the attack graph 230; and with computing services identified by the IDS 232 as being currently subject to a network attack. Thus, embodiments of the present invention generate an attack signature by the signature generator 224 based on a subset of the network traffic 234 being only the network traffic relevant to computing services indicated by the attack graph 230 and being identified by the IDS 232 as being currently subject to an attack. In this way, the basis for the definition of the attack signature is concentrated on a subset of pertinent network traffic resulting in more accurate and effective attack signature generation. Furthermore, the efficiency of the attack signature generation process is improved because the exclusion of network traffic data reduces the data processing requirements of the signature generator 224. Yet further the quality of the signature itself is improved as the signature is generated based only on pertinent network traffic without being affected by traffic associated with computing services not involved in the network attack or not identified as being subject to attack.

As will be apparent to those skilled in the art, a proper subset of a first set is a subset of the first set that is not equal to the first set.

As previously described the attack graph 230 can be used to identify a subset of computing services in the system 200 potentially involved in the network attack. Where the subset of computer services is a proper subset of the set of all computing services in the system 200 then advantages of embodiments of the present disclosure are realized because the signature generator 224 generates an attack signature on the basis of a reduced set of network traffic corresponding to a subset of network traffic associated with computing services involved in the network attack according to the attack graph 230 (i.e. a proper subset of the set of all network traffic 234).

Additionally, the subset of computer services is further refined to define a second subset of computer services containing only computer services identified by the IDS 232 as being subject to an attack. In this way a further subset of network traffic can be determined on which basis the signature generator 224 operates to generate the attack signature.

The attack signature is used by a traffic monitor 226 which is a hardware, software, firmware or combination component of the attack detector 220 to monitor production and/or operational network traffic 234 for the system 200. The traffic monitor 226 uses the generated attack signature to identify the network attack occurring in the system 200 and where such attacks are identified they are flagged as network attack identifications 250.

Figure 4:
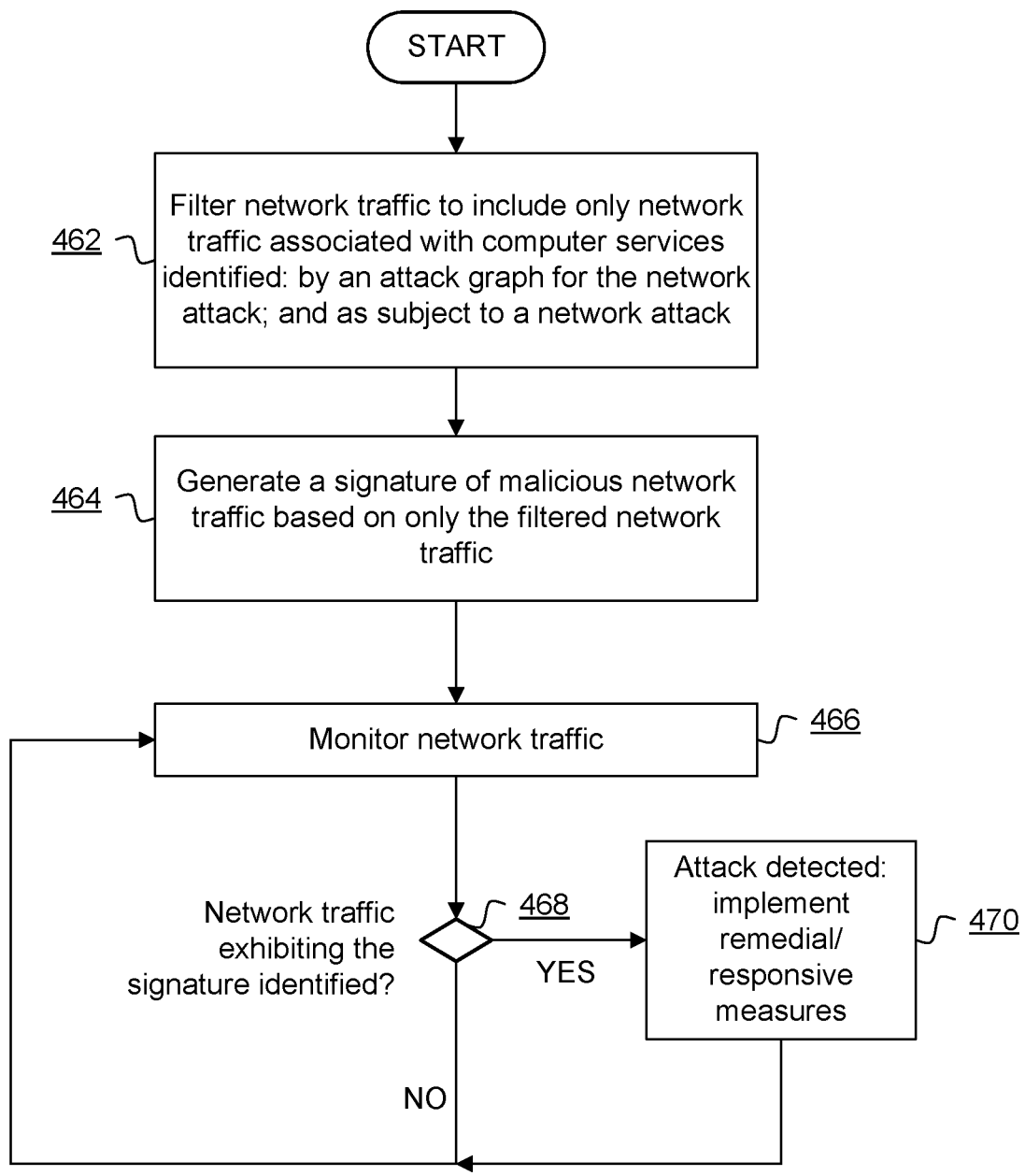
FIG. 4 is a flowchart of a method to identify a network attack in a network-connected computer system in accordance with embodiments of the present disclosure.

FIG. 4 is a flowchart of a method to identify a network attack in a network-connected computer system 200 in accordance with embodiments of the present disclosure. The method operates with the system 200 known to be subject to the network attack such that the attack is exhibited in network traffic 234. Initially, at 462, the traffic filter 222 filters the network traffic 234 to include only network traffic associated with computer services identified: by the attack graph 230 for the network attack; and by the IDS 232 as being subject to a network attack. At 464 the signature generator 224 generates a signature of malicious network traffic based on only the filtered network traffic from 462. At 466 the traffic monitor 226 monitors network traffic 234 (where the system 200 now operates in a production or operational mode, not known to be subject to the network attack). At 468, where the traffic monitor 226 identifies network traffic exhibiting or conforming to the signature the method proceeds to 470 where, for example, the attack is identified, flagged and/or remedial or responsive measures are taken.

Figure 5:
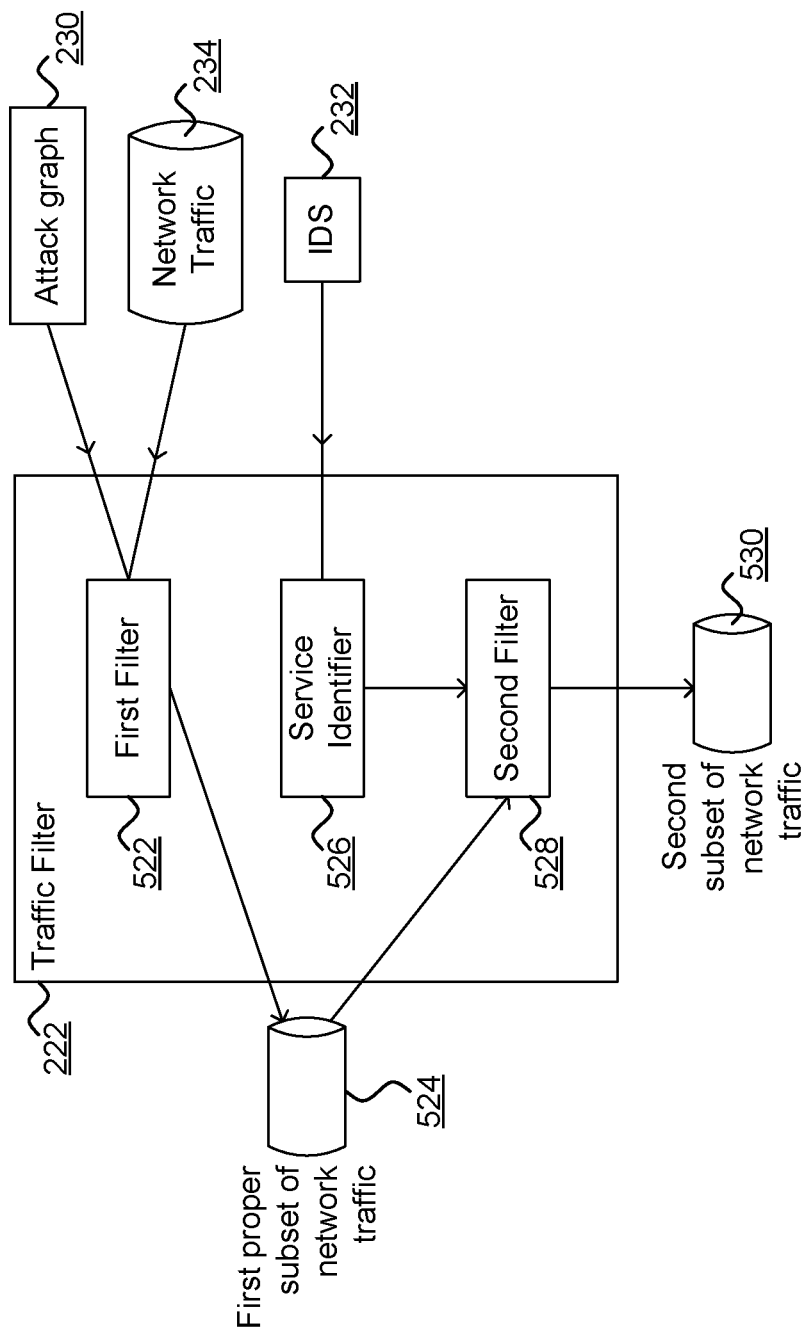
FIG. 5 is a component diagram of an exemplary traffic filter for use with the attack detector of FIG. 1 in accordance with embodiments of the present disclosure.
Figure 6:
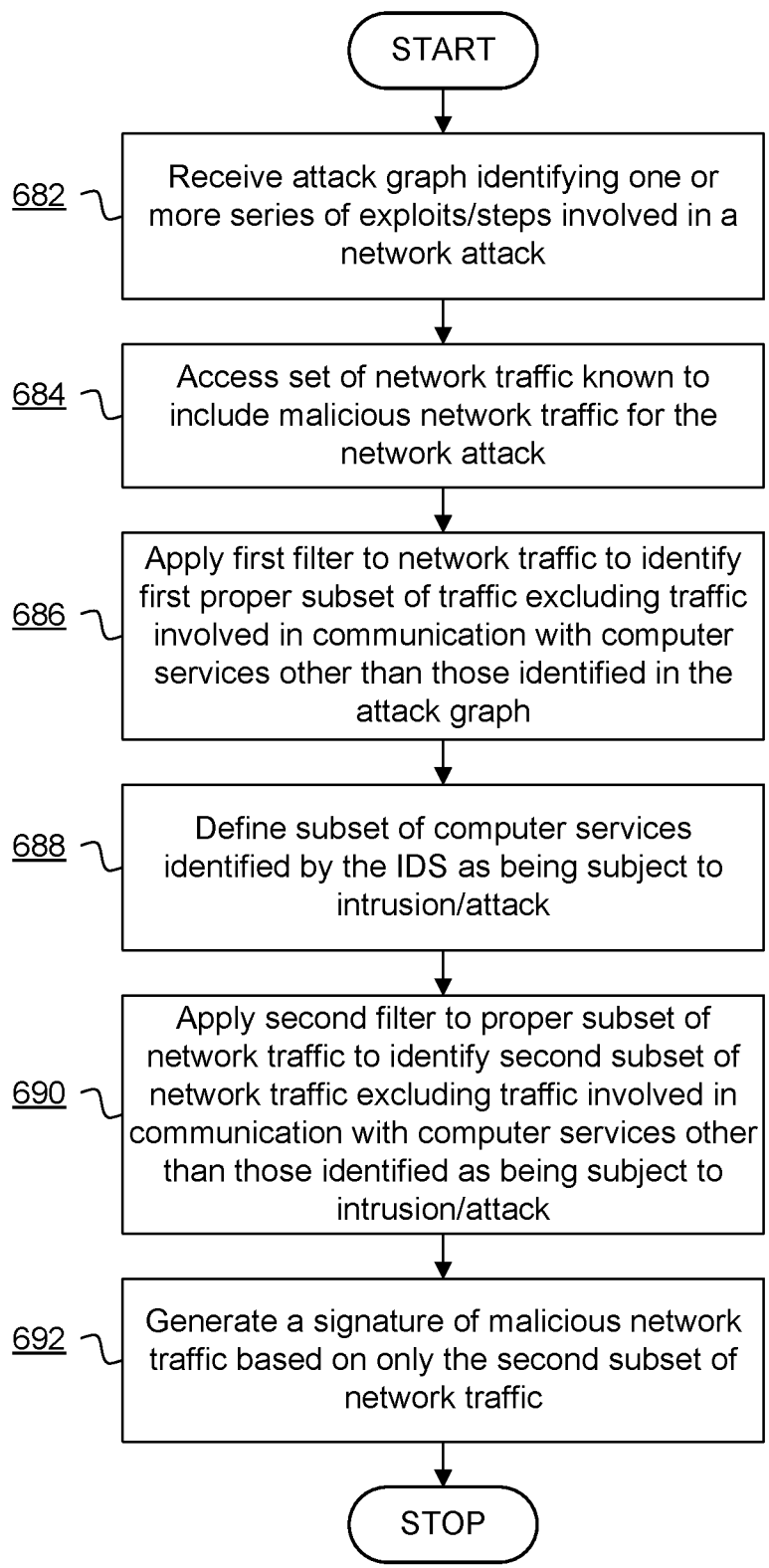
FIG. 6 is a flowchart of a method to identify a network attack in a network-connected computer system using a traffic filter such as that illustrated in FIG. 5 in accordance with embodiments of the present disclosure.

FIG. 5 is a component diagram of an exemplary traffic filter 222 for use with the attack detector 220 of FIG. 1 in accordance with embodiments of the present disclosure. FIG. 5 is to be read in conjunction with FIG. 6 which is a flowchart of a method to identify a network attack in a network-connected computer system 200 using a traffic filter 222 in accordance with embodiments of the present disclosure.

The traffic filter 222 according to FIG. 5 includes two filters as software, hardware, firmware or combination components: a first filter 522 for filtering network traffic data 234 based on the attack graph 230 to generate a first proper subset of network traffic 524; and a second filter 528 for filtering the first proper subset of network traffic 524 based on computing services identified by the IDS 232 as being subject to an attack to generate the second subset of network traffic 530. The second filter thus operates on the basis of a service identifier 526 component as a hardware, software, firmware or combination component for identifying services indicated by the IDS 232 as being subject to an attack or intrusion. The second subset of network traffic 530 accordingly excludes network traffic associated with computing services not indicated by the attack graph 230 or identified as being subject to attack or intrusion by the IDS 232.

Thus the first filter 522 receives the attack graph 230 (at 682) as a data structure containing data identifying one or more series of exploits and/or steps involved in a network attack. The first filter 522 accesses (at 684) a set of all network traffic 234 known to include malicious network traffic to identify (at 686) a proper subset of network traffic 524 that excludes network traffic involved in communication with computing services other than those identified in the attack graph 230. At 688 the service identifier 526 defines a subset of computer services identified by the IDS 232 as being subject to attack or intrusion. Subsequently, at 690, the second filter 528 is applied to the proper subset of network traffic 524 to define the second subset of network traffic 530 that further excludes traffic involved in communication with computer services other than those identified as being subject to attack or intrusion. Subsequently, at 692, the second subset of network traffic 530 is used by the signature generator 224 as previously described to generate a signature of malicious network traffic. Notably the tasks 466, 468 and 470 of FIG. 4 could further apply subsequent to task 692 in FIG. 6 to monitor a production system 200 for network attack and respond accordingly.

Consideration now turns to the closely related challenge of identifying an attacked computing device in a system of network-connected computing devices providing computing services. In particular, while the attack graph 230 indicates computing services exploited to achieve a network attack (and correspondingly computing devices that provide or include those services), further advantages can be realized from the attack graph 230 in a production computer system to identify additional computing devices that are subject to attack where such an attack has not been previously known. Such attacks that have not been previously known are commonly referred to as "zero day" attacks because there may be little or no experience of the attacks or the attacks may have evaded detection such that intrusion detection systems and security software such as IDS 232 may not yet be configured to detect such attacks.

Figure 7:
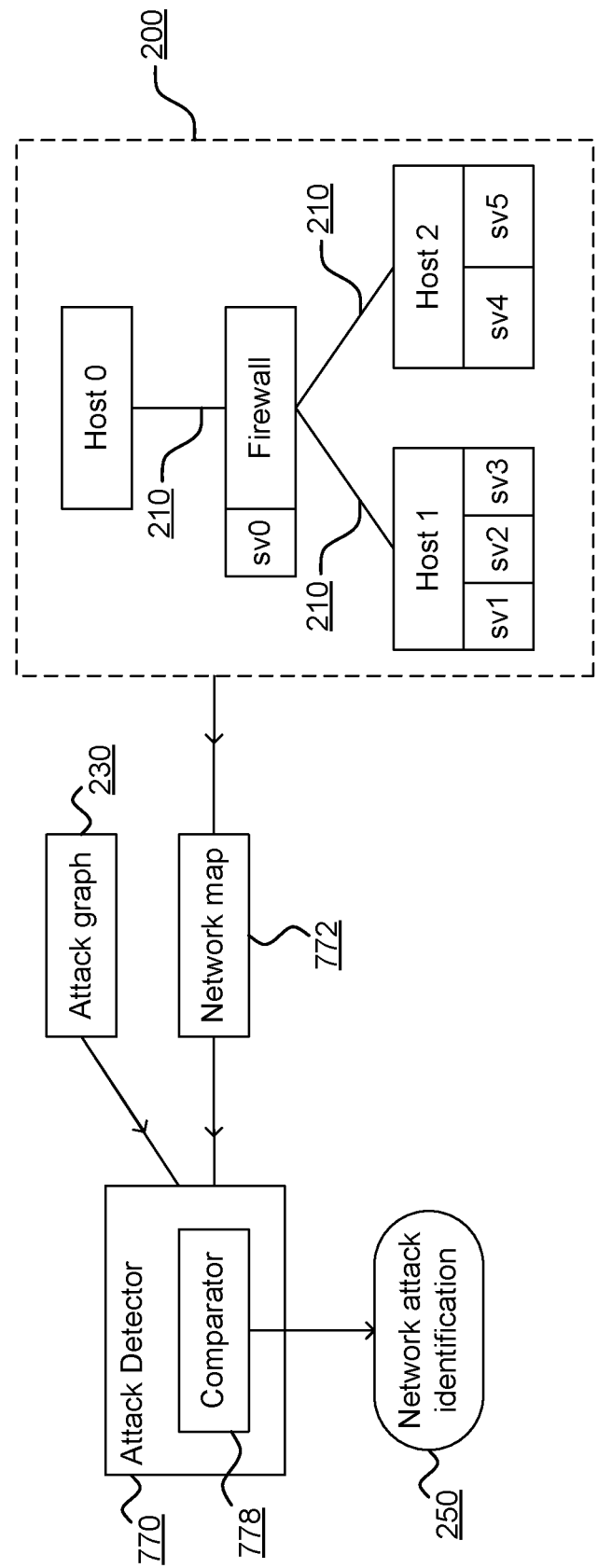
FIG. 7 is a component diagram of an attack detector for identifying a network attack based on a network map in accordance with embodiments of the present disclosure.

FIG. 7 is a component diagram of an attack detector 770 for identifying a network attack based on a network map 772 in accordance with embodiments of the present disclosure. Many of the features of FIG. 7 are common with those of FIG. 2 and these common features will not be repeated here. The network map 772 is a data structure representation including data modeling computing devices in the computing system 200 including the network connections of each computing device such that the map 772 provides an overall representation of the computing system 200. Such a network map 772 can be provided by an operator, designer or installer of the system 200 or the map 772 can be at least partly generated using an automatic network mapping tool such as OpNet (www.opnet.com) or SkyBox (www.skyboxsecurity.com). Thus based on the network map 772 network interconnections between computing devices can be identified and thus routes and/or paths through the network and between devices can be discerned. In practice, the illustration of the computing system 200 provided in the dashed box of FIG. 7 constitutes a reasonable example of a network map (albeit with the addition of computing service information which may be absent in a map, and albeit without host device and configuration information which may additionally be present in a map).

Figure 8:
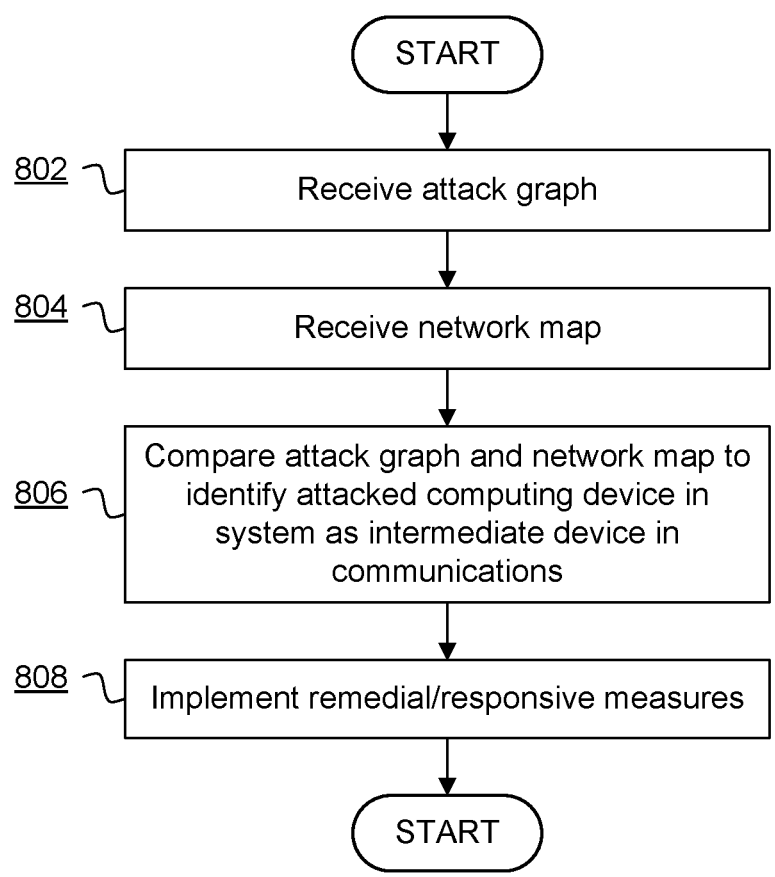
FIG. 8 is a flowchart of a method to identify an attacked computing device in a network-connected computer system in accordance with embodiments of the present disclosure.

The remainder of FIG. 7 should be read with further reference to FIG. 8 which is a flowchart of a method to identify an attacked computing device in a network-connected computer system 200 in accordance with embodiments of the present disclosure. The attack detector 770 of FIG. 7 is a software, hardware, firmware or combination component adapted to identify an attacked computing device in the network-connected computing system 200. The detector 770 initially receives the attack graph 230 at 802. Subsequently, at 804, the detector 770 receives the network map 772. The detector 770 includes a comparator component 778 as a hardware, software, firmware or combination component for comparing the attack graph 230 and the network map 772. The comparison (at 806) of the graph 230 and map 772 provides for an identification of computing devices in the system 200 that are necessarily involved in malicious network communication but that are not identified (such as by reference to their computing services) in the attack graph 230. For example, the attack graph 230 illustrated in FIG. 3 shows an attack path whereby the attacking user achieves trust between Host 0 and Host 2 by exploiting sv4 of Host 2 (leftmost path in the graph 230 of FIG. 3). However, according to the network map (exemplified by the illustration of the computing system in the dashed box of FIG. 7), Host 0 is separated from Host 2 by a Firewall. Thus a comparison of the attack path in the graph 230 and the network map 772 serves to identify a computing device (the Firewall) that must be involved in the malicious network communication. The comparison by the comparator 778 can be achieved by following each series of exploits in the graph 230, associating each exploit with a particular computing device in the system 200 (which may involve identifying candidate hosts based on exploited computing services), and identifying intermediate devices in communication between exploited devices as attacked computing devices.

Once identified, attacked computing devices can be subject to remedial and/or responsive measures or alerting can be performed to address the attack. Thus protective measures can be implemented to protect the computer system 200 from the attack. As will be appreciated by those skilled in the art, remedial and/or responsive measures as referred to herein can include: flagging an attack or malicious communication; disconnecting from the network one or more computing devices identified as being attacked or involved in malicious communication; performing anti-malware or anti-virus scans on identified computing devices; patching known vulnerabilities of identified computing services; and other responses and/or remediation's as will be apparent to those skilled in the art.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been set out relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to identify an attacked computing device in a system of network-connected computing devices providing a plurality of computing services with a processor integrated into a circuit, the method comprising:

receiving, using the processor, a first data structure including data modeling relationships between vulnerabilities of computing services in a first proper subset of the plurality of computing services and exploitation of the vulnerabilities to identify one or more series of exploits involved in a network attack;

receiving, using the processor, a second data structure including data modeling the computing devices in the system including network connections of each computing device; and comparing, using the processor, the first data structure and the second data structure to identify the attacked computing device as an intermediate device in communications between at least two computing services in any of the one or more series of exploits by following each of the one or more series of exploits, associating each exploit with a particular computing device of the computing devices, and identifying any intermediate device in communication between exploited devices as the attacked computing device.

2. The method of claim 1, further comprising, in response to the identification of the attacked computing device, implementing protective measures to protect the attacked computing device from the attack.

3. The method of claim 1, wherein the first data structure is an attack graph.

4. The method of claim 3, wherein the attack graph is a directed acyclic graph data structure.

5. The method of claim 1, wherein the second data structure is a network map.

6. The method of claim 1, wherein the second data structure is automatically generated by software adapted to map a networked computer system.

7. A computer system comprising:
a processor integrated into a circuit and memory storing computer program code including instructions for identifying an attacked computing device in a system of network-connected computing devices providing a plurality of computing services, including:
wherein the instructions, when executed on the processor, cause the computer system to implement:
receiving a first data structure including data modeling relationships between vulnerabilities of computing services in a first proper subset of the plurality of computing services and exploitation of the vulnerabilities to identify one or more series of exploits involved in a network attack;
receiving a second data structure including data modeling the computing devices in the system including network connections of each computing device; and
comparing the first data structure and the second data structure to identify the attacked computing device as an intermediate device in communications between at least two computing services in any of the one or more series of exploits by following each of the one or more series of exploits, associating each exploit with a particular computing device of the computing devices, and identifying any intermediate device in communication between exploited devices as the attacked computing device.

8. A non-transitory computer-readable storage medium storing a computer program element comprising computer program code to, when loaded into a computer system and executed by a processor integrated into a circuit thereon, cause the computer system to identify an attacked computing device in a system of network-connected computing devices providing a plurality of computing services, including:
wherein the computer program code, when executed on the processor, cause the computer system to implement:
receiving a first data structure including data modeling relationships between vulnerabilities of computing services in a first proper subset of the plurality of computing services and exploitation of the vulnerabilities to identify one or more series of exploits involved in a network attack;
receiving a second data structure including data modeling the computing devices in the system including network connections of each computing device; and
comparing the first data structure and the second data structure to identify the attacked computing device as an intermediate device in communications between at least two computing services in any of the one or more series of exploits by following each of the one or more series of exploits, associating each exploit with a particular computing device of the computing devices, and identifying any intermediate device in communication between exploited devices as the attacked computing device.

9. The method of claim 1, wherein associating each exploit with a particular computing device includes identifying the particular computing device based on exploited computing services.

10. The method of claim 1, wherein the attacked computing device is identified in the second data structure and not identified in the first data structure, wherein the attacked computing device is related to a service identified in both the first data structure and the second data structure.

* * * * *